Jan. 6, 1953 J. H. HANSSEN 2,624,530
VEHICLE COMPRISING AN AUTO-AIRPLANE COMBINATION
Filed Jan. 7, 1946 2 SHEETS—SHEET 1

Inventor
JOZEF HENDRIK HANSSEN,
By Wenderoth, Lind & Ponack
Attorneys

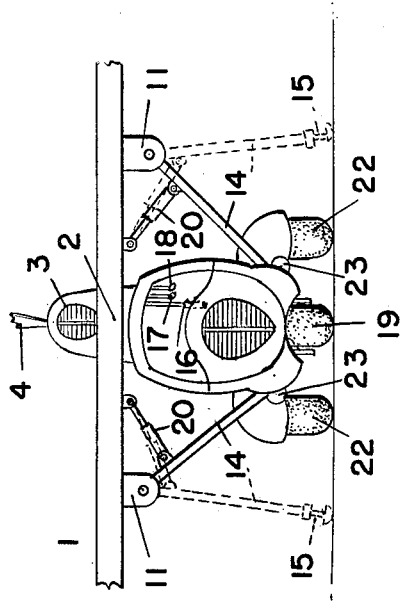
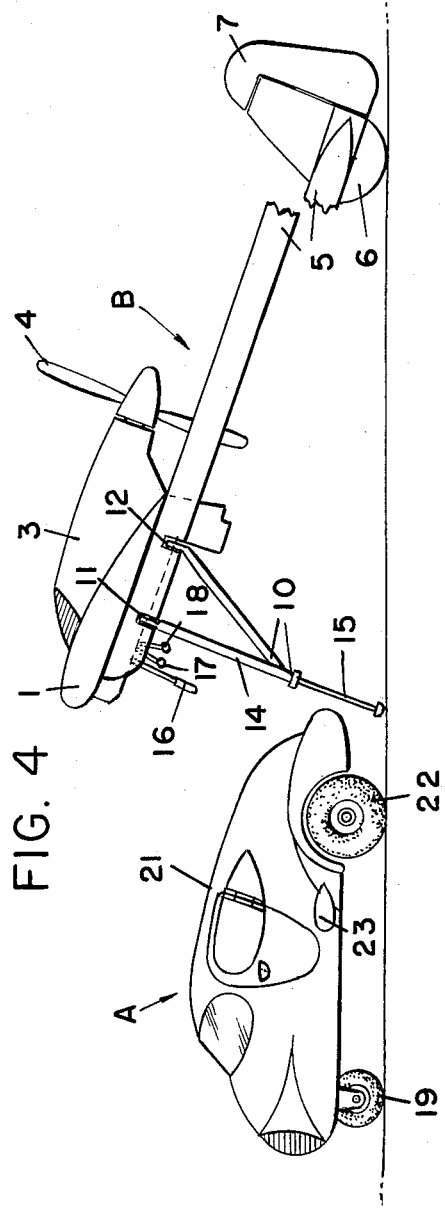

Patented Jan. 6, 1953

2,624,530

UNITED STATES PATENT OFFICE 2,624,530

VEHICLE COMPRISING AN AUTO-AIRPLANE COMBINATION

Jozef Hendrik Hanssen, Heerlen, Netherlands

Application January 7, 1946, Serial No. 639,541
In the Netherlands September 6, 1940

Section 1, Public Law 690, August 8, 1946
Patent expires September 6, 1960

5 Claims. (Cl. 244—2)

Up to the present one of the disadvantages of air traffic has been that the aircraft is bound to make its landing on special aerodromes which generally are located at a relatively large distance from cities, so that in order to travel from the aerodrome to the city or vice versa one is obliged to have recourse to some other vehicle, such as e. g. a motorbus, a taxi or the like, which naturally will cause loss of time. This question constitutes an obstacle for the economical use of the so-called sporting aeroplanes as a means of conveyance for business men.

The present invention relates to a vehicle by means of which the above mentioned disadvantage will be obviated and which will not only enable the owner thereof to reach with the same aeroplane in which he landed the city to which he belongs, but also to use the same vehicle in the said city or elsewhere.

According to the invention the vehicle comprises a combination of a motor vehicle and a normal aircraft which combination is that a certain number of the parts of the aircraft are detachably secured as an individual plane unit to the other part of the construction, which latter part constitutes a complete motor vehicle.

Moreover according to the invention the vehicle may consist of an aircraft the detachable landing gear of which forms a complete motor vehicle.

With a vehicle of this kind the pilot will be able after having reached the aerodrome to detach the connection between the plane unit and the landing gear built as a motor vehicle then and there, to separate the two parts, leaving the plane unit temporarily on the aerodrome while he goes to the city and back, and to continue his journey through the air, after having re-established the connection between the two parts.

Figure 1:
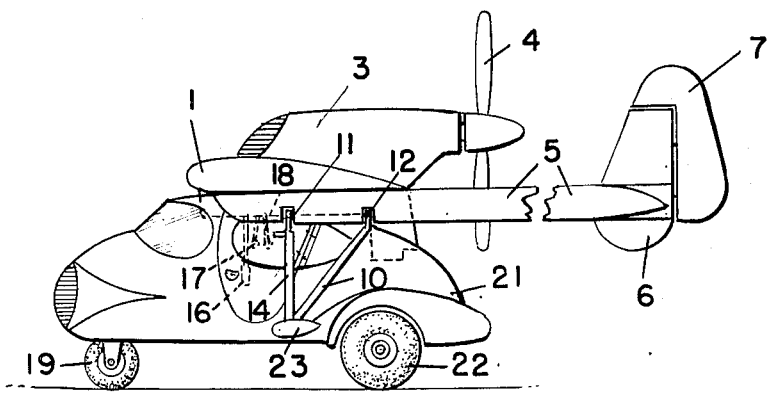
Figure 2:
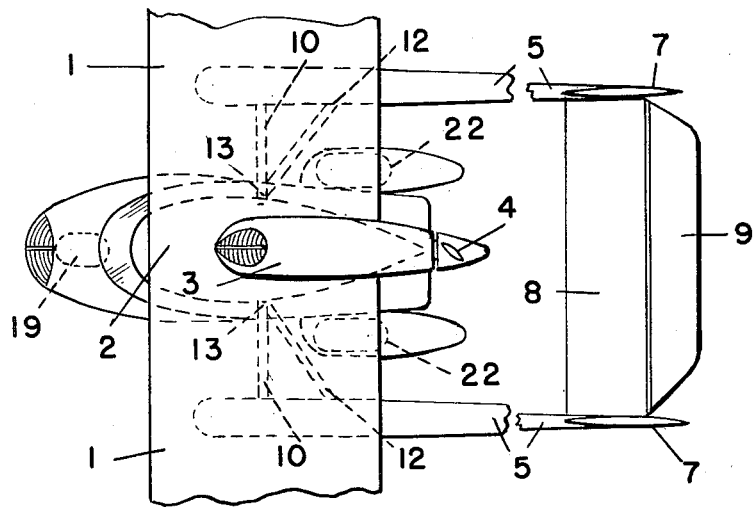

An embodiment of the invention will now be further explained with the aid of the schematic drawing, in which Fig. 1 is a side elevation of the complete vehicle.
Fig. 2 is a plan view.
Fig. 3 is a front view.
Fig. 4 is a side elevation of the plane unit and the landing gear auto unit detached from each other.

The plane unit comprises the supporting surface which consists of the two wings 1 and a central portion 2 containing the engine 3 with the propeller 4, the body parts 5 each comprising a keel surface 6 and a rudder 7. The two keel surfaces or body parts are interconnected by the stabilizing surface 8 and the elevator 9, as well as by diagonal connecting and stiffening members not indicated in the drawing. The plane unit B is moreover provided with the connecting members by means of which the said plane unit is secured to the auto unit A, as well as with means for separating the plane unit and the auto unit. These latter means may consist of two V-shaped extensible posts 10 consisting e. g. of tubing, one of which is provided on each side of the landing gear.

The upper ends 11, 12 of the said posts are hingedly connected to the wings. The posts may be locked in various positions by means of locking rods 20 which can be extendible or the like. The lower ends 13 may be detachably secured to the auto unit A and any conventional means can be used for this purpose. Such securing or supporting means are broadly shown at 23. The rods 10, in the embodiment illustrated in the drawing also serve as connecting members and as supports for the plane unit when the auto unit is disconnected from the same.

Additional detachable connecting members, e. g. between the central portion of the supporting surfaces and the upper side of the landing gear have not been indicated in the drawing for the sake of greater clarity.

The foremost tubes 14 of the V-shaped posts are hollow and contain an extension piece 15 telescoped into the same, the upper end of which extension piece is provided with a piston fitting into the post. Liquid may be pumped into the post at its upper end, whereby the extension piece 15 is driven out of the lower end of the post. It will, of course, be possible to operate this device pneumatically or mechanically instead of hydraulically.

The remaining parts of the plane unit B are of the usual shape, with the exception of the fact that the operating members 16, 17, 18 for the rudders are arranged so that they will extend into the cabin 21 of the auto unit A so that the pilot seated in the same may be able to handle them. The profile of the wing may be adapted to various requirements, depending on whether the aircraft is to develop a high rate of speed, or is to offer the greatest possible safety.

The auto unit A is constructed as a motor tricycle and is provided with its own engine. The front wheel 19 serves as a nose wheel during landing and taking off, whereas when the auto unit is separately used as a motor car it will serve as a steering wheel and the rear wheels 22 complete the support for the vehicle. When the front wheel is used as a nose wheel it is locked in the central position. The engine belonging to the auto unit which engine, in order to insure as light a weight as possible, preferably will be a two-stroke cycle motor, is arranged above the wheel 19 between the prongs of the front fork.

In order to absorb the shocks during landing the auto unit moreover may be provided with shock absorbers which, if desired, may have a hydraulic or pneumatic action.

When flying the device will be in the condition illustrated in Fig. 1. The plane unit is connected with the auto unit by means of the V-shaped posts 10 and of the other connecting means. The said posts are locked in their position with regard to the plane unit and the auto unit by means of locking rods 20.

The pilot is seated in the cabin 21 of the auto into which the controls 16, 17, 18 extend from above. After the landing has been accomplished, the lower ends 13 of the V-shaped post are disconnected and, after the locking rods 20 have been loosened, brought into the position indicated in dotted lines in Fig. 3, in which position they are resting on the ground one on each side of the vehicle. The other connecting members are subsequently disconnected, while liquid or air is pumped into the upper space of the prongs 14, whereby the entire plane unit is lifted up and brought into the position according to Fig. 4. One may then drive away from under the plane unit in the auto unit A, after starting the engine thereof and freeing the front wheel 19. In order to re-establish the connection between the two parts, the manipulations described above are to be carried out in the reverse order, while the liquid or air is exhausted from the prongs 14.

I claim:

1. A combination automobile and airplane comprising an auto unit and a plane unit separable therefrom, connecting means for securing said units to form an airplane, said auto unit comprising a complete landing gear assembly for said combination, said auto unit further comprising a complete automobile when disconnected from said plane unit, said connecting means comprising posts hingedly connected at the upper end thereof to said plane unit and connected at the lower end thereof to said auto unit, said posts having an extensible portion for lifting said plane unit from said auto unit when disconnected therefrom and supporting said plane unit when so lifted said posts being V-shaped when in retracted position and Y-shaped when in extended position.

2. In a combination automobile and airplane as claimed in claim 1, said plane unit comprising a wing section, a body portion extending rearwardly from said wing section and a tail assembly secured to said body portion, said tail assembly having a vertical fin with a rounded bottom portion whereby when said units are disconnected and said extensible posts are extended the forward portion of said plane unit is lifted from said auto unit and pivoted on said rounded portion of said vertical fin to release said auto unit.

3. In a combination automobile and airplane comprising an auto unit and a plane unit separable therefrom, means for connecting said units to form an airplane, a tail member on said plane unit having a rounded lower surface, said means comprising extensible posts and also serving to separate said units and support said plane unit in cooperation with said rounded tail portion when disconnected from said auto unit by pivoting said plane unit on said tail.

4. A combination automobile and airplane comprising an auto unit and a plane unit separable therefrom, said auto unit comprising a complete landing gear assembly for the said combination when said units are connected so as to form an airplane and said auto unit comprising a complete automobile when disconnected from said plane unit, connecting means for attaching said auto unit and said plane unit, said connecting means comprising posts, an end of which is connected to said plane unit and the other end of which is connected to said auto unit, said posts being longitudinally adjustable whereby upon disconnection from said auto unit the said posts may be extended to facilitate separation of said plane unit from said auto unit by lifting said plane unit.

5. In a composite road and air vehicle, a wheeled main body portion, a wing and fuselage subassembly detachable therefrom, and means for supporting said sub-assembly comprising strut members movably secured to said sub-assembly, said strut members being of such length and so placed that in one position thereof they extend downwardly to a plane as low as the bottoms of the wheels of said main body portion and support the wing of said sub-assembly in straddling relation to said body portion, and in a second position thereof they extend inwardly to said main body portion in upwardly spaced relation to said plane, and means for securing said strut members to said body portion in said second position.

JOZEF HENDRIK HANSSEN.

REFERENCES CITED

The following references are of record in the file of this patent:

UNITED STATES PATENTS

| Number | Name | Date |
|---|---|---|
| 1,797,713 | Brogelli | Mar. 24, 1931 |
| 1,925,768 | Maryo | Sept. 5, 1933 |
| 2,156,288 | Halliday | May 2, 1939 |
| 2,215,003 | Johnson | Sept. 17, 1940 |
| 2,373,467 | Frakes | Apr. 10, 1945 |